ARTHUR ALEXANDRE.
Improvement in Handle Straps for Traveling Bags.
No. 119,293.  Patented Sep. 26, 1871.
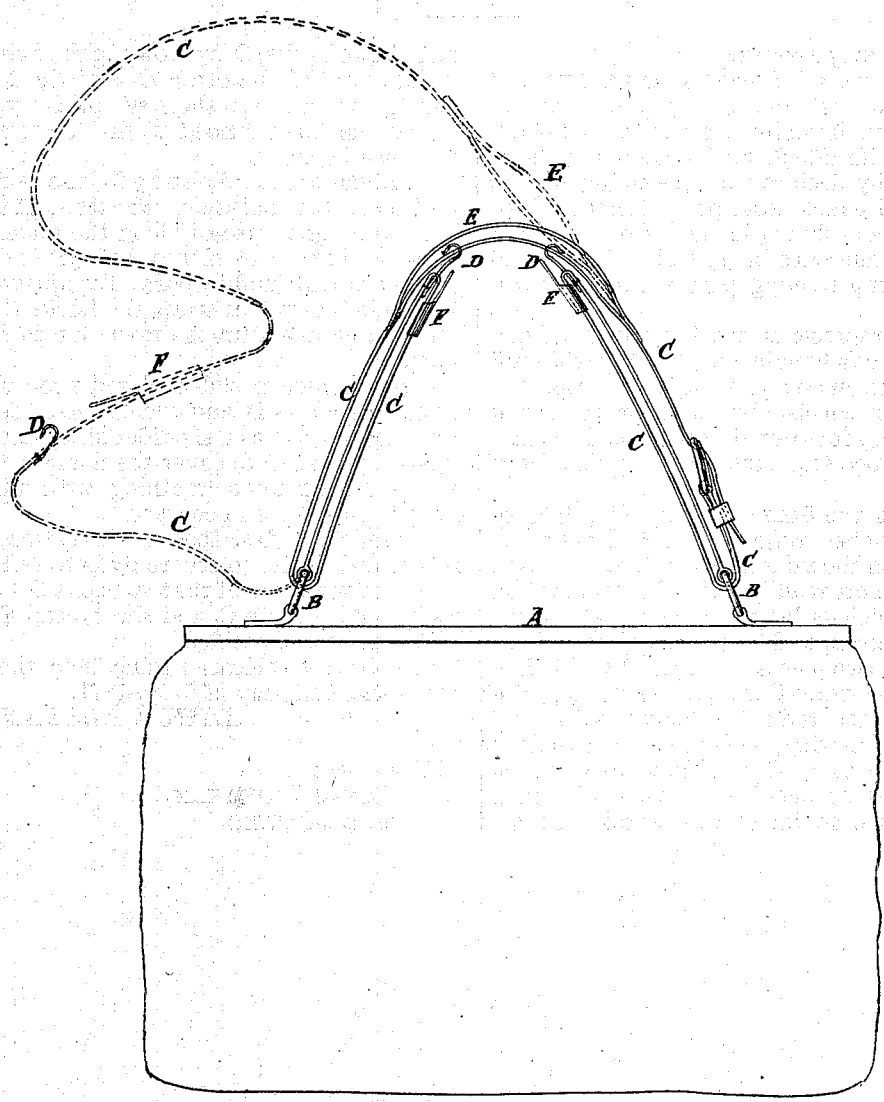

119,293

UNITED STATES PATENT OFFICE.

ARTHUR ALEXANDRE, OF NEW YORK, N. Y.

IMPROVEMENT IN HANDLE-STRAPS FOR TRAVELING-BAGS.

Specification forming part of Letters Patent No. 119,293, dated September 26, 1871.

*To all whom it may concern:*

Be it known that I, ARTHUR ALEXANDRE, of the city of New York, in the county and State of New York, have invented a new and useful Improvement in Handle-Strap for Traveling-Bags; and I do hereby declare that the following is a full, clear, and exact description thereof, which will enable others skilled in the art to make and use the same, reference being had to the accompanying drawing forming part of this specification.

The figure represents my improved handle-strap adjusted as a handle, but showing in dotted lines one end extended as a shoulder-strap.

My invention consists in the improvement of the handle-strap for traveling-bags, as hereinafter fully described and subsequently pointed out in the claim.

A represents the frame of a traveling-bag, to which are attached rings B, which I prefer to make square, as allowing the strap C to be passed through them more readily. C is the strap, which is made of sufficient length to adapt it to serve as a shoulder-strap, and which may be made in one piece, or in two pieces connected by a buckle. The ends of the straps C are passed through the rings B and are secured to the body of said strap by a button, by sewing, or by other convenient means. To the strap C, at a distance from its ends equal to about one-third the distance from said ends to the center of said straps, are attached two hooks, D, as shown in the figure. The middle part of the strap C is made double by having the ends of a short strap, E, attached to it, and has holes formed in the lower ply to receive the hooks D.

To adjust the handle-strap for use as a handle, the hooks D are passed inward through the rings B and brought upward along the under side of the strap C and hooked into the holes in the lower ply of its double middle part. To adjust the strap for use as a shoulder-strap, the hooks D are unhooked and the strap is drawn out to its entire length.

F are keepers or slides placed upon the strap C near the hooks D, and which, when the strap is extended for use as a shoulder-strap, are slipped over the hooks D to cover them and keep them from catching upon anything with which the strap C may come in contact.

Having thus described my invention, I claim as new and desire to secure by Letters Patent—

The arrangement of the two hooks D, two keepers, F, double strap C, and short strap E, as and for the purpose specified.

The above specification of my invention signed by me this 14th day of July, 1871.

ARTHUR ALEXANDRE.

Witnesses:
JAMES T. GRAHAM,
T. B. MOSHER. (114)